United States Patent
Prinzinger

(10) Patent No.: US 10,392,198 B2
(45) Date of Patent: Aug. 27, 2019

(54) FEED DEVICE FOR FEEDING ROUND BLANK RINGS MADE FROM PLASTIC AND ARRANGEMENT FOR TRANSPORTING OF SUCH ROUND BLANK RINGS

(71) Applicant: SCHULER PRESSEN GMBH, Goeppingen (DE)

(72) Inventor: Helmut Prinzinger, Boehmenkirch (DE)

(73) Assignee: SCHULER PRESSEN GMBH, Goeppingen (DE)

( * ) Notice: Subject to any disclaimer, the term of this patent is extended or adjusted under 35 U.S.C. 154(b) by 0 days.

(21) Appl. No.: 15/944,856

(22) Filed: Apr. 4, 2018

(65) Prior Publication Data

US 2018/0222688 A1   Aug. 9, 2018

Related U.S. Application Data

(63) Continuation-in-part of application No. PCT/EP2016/071228, filed on Sep. 8, 2016.

(30) Foreign Application Priority Data

Oct. 8, 2015   (DE) .................. 10 2015 117 199
Mar. 15, 2016   (DE) .................. 10 2016 204 208

(51) Int. Cl.
*B65G 47/06* (2006.01)
*B65G 57/03* (2006.01)
(Continued)

(52) U.S. Cl.
CPC .............. *B65G 47/06* (2013.01); *B44B 5/024* (2013.01); *B65G 47/846* (2013.01); *B65G 57/03* (2013.01);
(Continued)

(58) Field of Classification Search
CPC ........ B65G 33/06; B65G 15/14; B65G 15/42; B65G 47/57; B65G 57/03; B65G 57/035; B65G 47/06; B65G 47/80; B65G 47/846
(Continued)

(56) References Cited

U.S. PATENT DOCUMENTS 3,708,054 A * 1/1973 Gilev ..................... B65G 33/04
198/388
4,201,505 A * 5/1980 Gerhart .................. B65G 57/03
198/448
(Continued)

FOREIGN PATENT DOCUMENTS

DE   20 37 752 A1   2/1972
DE   198 41 622 A1   3/2000
(Continued)

OTHER PUBLICATIONS

English translation of International Search Report for corresponding international application PCT/EP2016/071228, 3 pages, dated Nov. 2, 2016.

*Primary Examiner* — James R Bidwell
(74) *Attorney, Agent, or Firm* — Ronald S. Lombard

(57) ABSTRACT

The invention relates to an arrangement (20) to transport a round blank ring (30) made from plastic from a receiving location (35) to an assembly station (90). A every point in time, the orientation and the position of the round blank ring (30) are predefined, at least within a tolerance range. To execute a movement from top to bottom in a height direction (H), it is possible to use a feed device (34) with a motor-driven conveying unit (58). This conveying unit (58) moves one or more round blank rings (30) in a positively guided manner downward in the height direction (H) to a delivery location (36). At every point in time as this is done, the orientation of the round blank ring relative to the height (Continued)

direction (H) is defined, at least within a predefined tolerance range.

22 Claims, 9 Drawing Sheets

(51) Int. Cl.
  *B65G 47/84* (2006.01)
  *A44C 21/00* (2006.01)
  *B65G 47/80* (2006.01)
  *B44B 5/02* (2006.01)
(52) U.S. Cl.
  CPC .............. *A44C 21/00* (2013.01); *B65G 47/80* (2013.01); *B65G 2201/022* (2013.01); *B65G 2207/14* (2013.01); *B65G 2811/061* (2013.01); *B65G 2812/016* (2013.01); *B65G 2812/02217* (2013.01); *B65G 2812/14* (2013.01)
(58) Field of Classification Search
  USPC .............................. 198/607, 663, 625, 468.8
  See application file for complete search history.

(56) References Cited

U.S. PATENT DOCUMENTS

| | | | | |
|---|---|---|---|---|
| 4,264,254 A | * | 4/1981 | Chang | B65G 57/04 |
| | | | | 29/241 |
| 4,395,864 A | * | 8/1983 | Anderson | B65B 5/06 |
| | | | | 53/254 |
| 5,113,992 A | * | 5/1992 | Sadamori | H01L 21/67778 |
| | | | | 198/347.1 |
| 7,500,819 B2 | * | 3/2009 | Nielsen | B65G 57/035 |
| | | | | 198/468.8 |
| 8,154,314 B2 | * | 4/2012 | Shim | G01R 31/2893 |
| | | | | 198/347.1 |
| 2004/0146392 A1 | | 7/2004 | Tsukahara et al. | |
| 2013/0160516 A1 | | 6/2013 | Karasawa et al. | |

FOREIGN PATENT DOCUMENTS

| | | |
|---|---|---|
| DE | 10 2010 013 148 A1 | 9/2011 |
| EP | 0 320 731 A2 | 6/1989 |
| EP | 1 048 596 A2 | 11/2000 |
| FR | 2 146 586 A5 | 3/1973 |

* cited by examiner

FEED DEVICE FOR FEEDING ROUND BLANK RINGS MADE FROM PLASTIC AND ARRANGEMENT FOR TRANSPORTING OF SUCH ROUND BLANK RINGS

CROSS-REFERENCE TO RELATED APPLICATION

This is a continuation-in-part application of international application PCT/EP2016/071228 filed Sep. 8, 2016, and claiming the priority of German application No. 10 2015 117 199.6 filed Oct. 8, 2015 and the priority of German application No. 10 2016 204 208.4 filed Mar. 15, 2016. The said International application PCT/EP2016/071228 and said German application No. 10 2015 117 199.6 and said German application No. 10 2016 204 208.4 are incorporated herein by reference in their entireties as though fully set forth.

The invention relates to a feed device for feeding round blank rings made from plastic from a receiving location to a delivery location and an arrangement for transporting such round blank rings made from plastic from a receiving location to an assembly station. The arrangement can comprise at least one feed device.

DE 10 2010 013 148 A1 describes a three-part coin or round blank with a round blank core, a round blank ring, and an outer ring. The round blank core and the outer ring consist of metallic materials. The round blank ring made of a polymer is arranged between the round blank core and the outer ring.

The round blank ring made from plastic is very light compared with the other parts of the coin. Moreover, it possesses a small spring stiffness and a higher coefficient of friction. During transport, it can pick up a static electric charge and adhere to surfaces. If a force or a pressure is exerted on the round blank ring, it deforms very easily and can, if the external effect is decreased, move in an uncontrolled manner due to the elastic relaxation. These properties have the result that round blank rings made from plastic cannot be transported with the transport or conveyor devices used up to now. The light round blank rings can, for example, very easily jam or stick to inner walls of tubes or sloping surfaces, etc.

Therefore, it can be considered to be the goal of this invention to create a feed device and an arrangement for transporting such round blank rings made from plastic that further transports the round blank rings from a receiving location with high reliability.

SUMMARY OF THE INVENTION

This is accomplished by a feed device and an arrangement having the features of the claims. The invention relates to an arrangement 20 to transport a round blank ring 30 made from plastic from a receiving location 35 to an assembly station 90. At every point in time, the orientation and the position of the round blank ring 30 are predefined, at least within a tolerance range. To execute a movement from top to bottom in a height direction H, it is possible to use a feed device 34 with a motor-driven conveying unit 58. This conveying unit 58 moves one or more round blank rings 30 in a positively guided manner downward in the height direction H to a delivery location 36. At every point in time as this is done, the orientation of the round blank ring relative to the height direction H is defined, at least within a predefined tolerance range.

The feed device is provided to convey round blank rings made from plastic from a receiving location to a delivery location arranged beneath the receiving location in a height direction. To accomplish this, the feed device has a motor-driven conveying unit. The conveying unit is configured to convey a round blank ring downward in the height direction in a positively guided manner. During this conveyance in a positively guided manner, the position and orientation of the conveyed round blank ring are predefined or are restricted to a deviation from a desired orientation that is within a predefined tolerance range. The round blank ring can be conveyed by the conveying unit in a way that is restricted or defined in multiple degrees of freedom. Preferably, only rotation about the central axis of the ring is allowed, while movements in all other degrees of freedom are prevented or at least restricted. At every point in time during the conveyance movement by the conveying unit, the round blank ring has an orientation with respect to the height direction that is defined at least within the predefined tolerance range.

The height direction preferably corresponds to the vertical direction. The height direction can also be arranged at an angle to the vertical direction. A round blank ring that is to be conveyed is moved downward by the conveying unit in a controlled manner. An undefined free fall, such as is possible in the case of metallic round blank rings, is avoided. The conveyance speed can be predefined independently of the fall speed that can be achieved due to the weight of the round blank ring. In particular, the conveyance speed can be greater than the fall speed that can be achieved. As the round blank ring is being conveyed, the conveying unit can hold it in a form-fit manner in the predefined orientation—apart from play that is present—and move it to the delivery location.

The delivery location can preferably be arranged at the place where the round blank rings are transferred to the buffer storage in a predefined orientation.

In a preferred embodiment, the delivery location of the feed device can be arranged at an upper free end of a pin. The pin can have round blank rings made from plastic stacked on it one on top of one another, to form a buffer storage. Instead of a pin, another type of buffer storage could also be provided. The pin can be supported so that it is movable in the height direction.

In a preferred embodiment, the conveying unit is configured to convey, in the height direction, a single round blank ring and/or multiple round blank rings that are spaced from one another in the height direction simultaneously. For example, the conveying unit can have multiple receiving pockets or multiple receiving recesses, in every one of which a round blank ring can be arranged and conveyed. In other sample embodiments, the conveying unit is provided only to convey one round blank ring to the delivery location at a time one after the other in sequence. For example, here the conveying unit can have a ramming tool that can be moved up and down in the height direction.

It is preferred that the conveying unit come in contact with the round blank ring at least at two places. The places are preferably spaced from one another in the peripheral direction. This makes it possible to specify an orientation of the round blank ring relative to the height direction.

Moreover, it is advantageous if the conveying unit overlaps the top and bottom of the round blank ring at least in one location. The round blank ring is surrounded, so to speak. This can also determine the orientation.

In a preferred embodiment, the conveying unit has at least one rotationally driven conveying element. The conveying element is preferably always driven in the same direction of rotation—clockwise or counterclockwise—without reversing the direction of rotation. Driving the at least one conveying element without reversing the direction of rotation makes it possible to achieve high conveyance rates of up to 1,000 round blank rings per minute.

It is preferred that the rotation of the conveying element is not continuous, but rather intermittent. For example, the conveying unit can have an electric motor, in particular a servo motor, which can rotate the conveying element step-by-step by a predefined angle. It is preferable that the start of a rotation not be controlled by a fixed clock pulse, but rather be predefined by a start signal, for example by a sensor signal of a sensor device.

In one sample embodiment, the at least one conveying element can be driven about an axis of rotation extending at right angles to the height direction. In another sample embodiment, the axis of rotation can also be oriented parallel to the height direction.

Moreover, it is preferred for each of the at least one conveying elements to have a delimiting surface in each of the upward and downward directions. The receiving recess can be open, at least in one spatial direction. In the preferred sample embodiments, the receiving recess is similar to a groove, and can be open at the two groove ends and opposite the base of the groove.

In one preferred sample embodiment, the at least one conveying element is formed by a gear. In this case, the receiving recess can be formed by a tooth gap between two teeth of the gear.

In one preferred sample embodiment, the at least one conveying element can be formed by a conveying spindle. The latter has a conveying groove, at least sections of which helically circle the axis of rotation, which can form the receiving recess. This conveying groove can convey one round blank ring per thread.

It is preferred if there are two conveying elements spaced apart from one another in a transverse direction that is oriented at right angles to the height direction. The two conveying elements simultaneously hold a round blank ring to be conveyed in a receiving recess in each of them at diametrically opposite locations, and convey this round blank ring in this way. Such an arrangement can specify the orientation of the round blank ring very exactly or keep deviations from a desired orientation within the tolerance range.

Moreover, it is advantageous if there is a sensor device at the receiving location. The sensor device is configured to detect whether there is a round blank ring in an initial position at the receiving location. The sensor device preferably works in a contactless manner on the basis of electromagnetic radiation, for example by means of light. The sensor device can be in the form of a light barrier or a camera. It preferably produces a sensor signal that indicates whether there is a round blank ring in the initial position. This sensor signal can be used as a start signal for the conveyor device to start the conveyance movement. Therefore, the conveyance movement by the conveying unit is switched by the sensor signal. Therefore, a fixed predefined clock pulse to execute the conveyance movement is not required, and is not provided. In this embodiment, the conveyance movement can also work reliably even when the round blank rings are not made available at the receiving location in a predefined fixed cycle, but rather can be transported to the receiving location at different intervals.

The conveying unit is preferably designed so that it moves the round blank rings away from the receiving location in the height direction more quickly than the round blank rings are moved to the receiving location. The round blank rings are preferably pushed to the receiving location in a row by contact with one another. If the front most round blank ring has reached the receiving location, the round blank rings may not be deformed or pushed on top of one another. Therefore, the round blank ring located in the initial position is moved away in the height direction in less than 0.2 to 0.3 seconds, preferably within a time period of 0.05 seconds to 0.25 seconds, and within this time period the receiving location becomes free again to receive the next round blank ring.

The inventive arrangement to transport round blank rings made from plastic from a receiving location to an assembly station transports the round blank ring to be transported in a positively guided manner at every point in time, so that its orientation with respect to a vertical or horizontal reference axis or reference plane is, at every point in time, predefined or is restricted to a predefined tolerance range. At the assembly station, the round blank ring is assembled or connected with at least one other round blank part. For example, the round blank ring made from plastic can be inserted into an outer ring and/or a round blank core can be inserted into the round blank ring made from plastic. At this point in time, the weight is increased by the additional round blank parts, and the subsequent transport is simplified. The problem of the light round blank ring made from plastic that needs to be transported is then eliminated or reduced.

The arrangement for transporting round blank rings can have at least one feed device, as was described above.

BRIEF DESCRIPTION OF THE DRAWINGS

Advantageous embodiments of the invention follow from the claims, the description, and the drawings. Preferred embodiments of the invention are explained in detail below using the attached drawing. The figures are as follows:

DETAILED DESCRIPTION OF THE INVENTION

Figure 1:
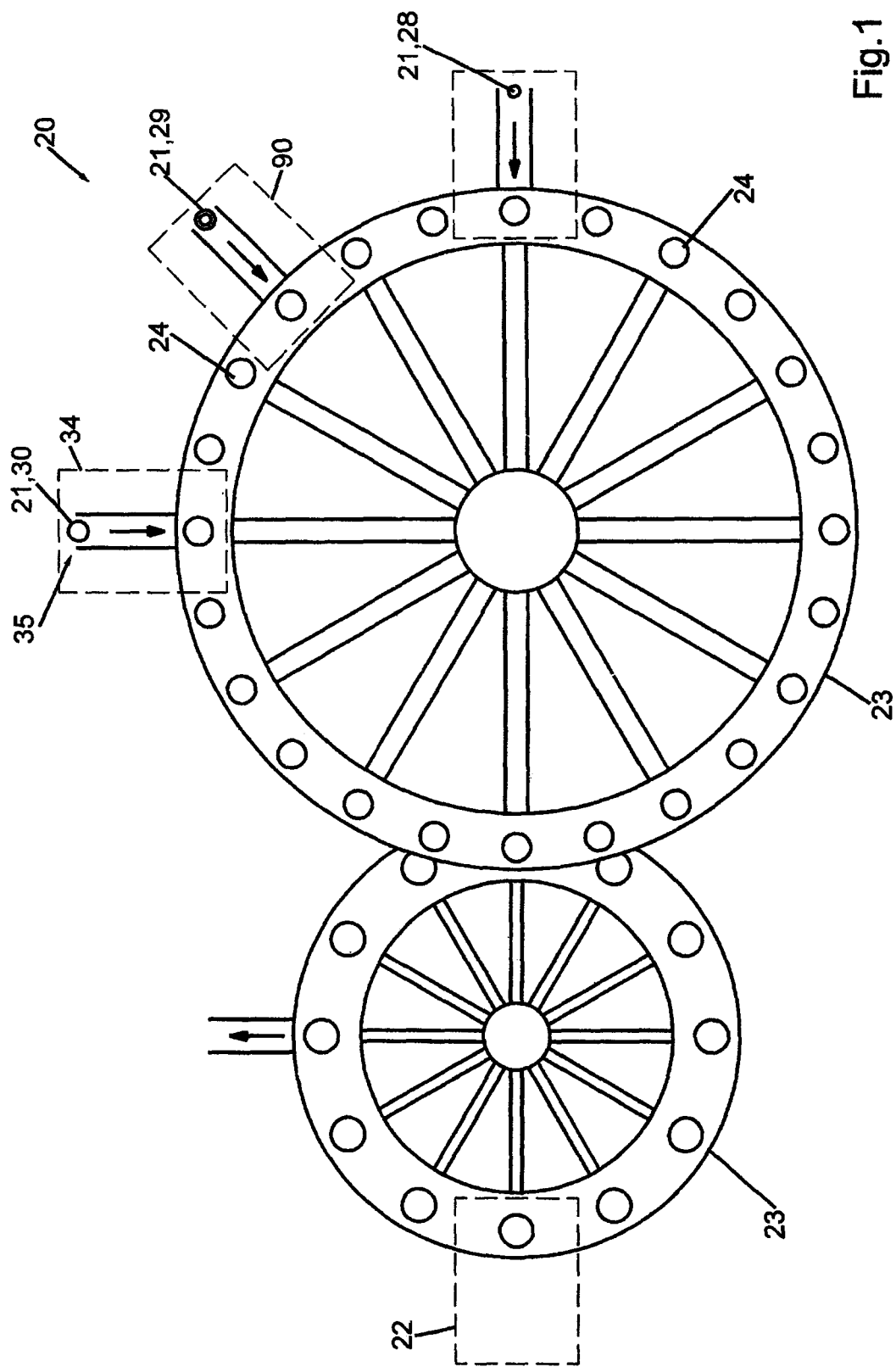
FIG. 1 is a schematic block diagram-like representation of an arrangement for transporting round blank parts.
Figure 10:
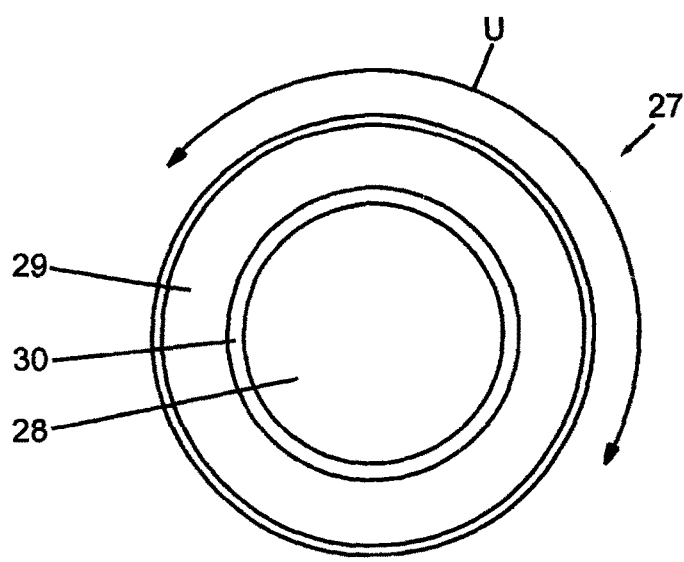
FIG. 10 is a coin that has the round blank parts from FIG. 9 and that is in assembled, ready minted state.
Figure 11:
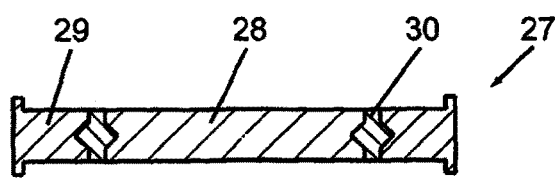
FIG. 11 is a cross section through the coin from FIG. 10.

FIG. 1 schematically shows an arrangement 20 for transporting a round blank or round blank parts 21 to a minting station 22. The arrangement 20 can include one or more rotary tables 23, each of which has, in its peripheral area, multiple pockets 24, in which a round blank or at least a round blank part 21 can be positioned and transported. In the sample embodiment, three different round blank parts 21 are provided for producing the coin 27 (FIGS. 10 and 11): a round blank core 28, an outer ring 29, and a round blank ring 30. The round blank ring 30 is arranged between the round blank core 28 and the outer ring 29.

The round blank core 28 and the outer ring 29 each consist of the same or different metallic materials or alloys.

The round blank ring 30 consists at least essentially of plastic. It has a small mass, which is at least clearly smaller than that of the round blank core 28 and that of the outer ring 29. Moreover, it has a smaller spring stiffness than a round blank part 21 made from a metal or another metal alloy. The round blank ring 30 can also pick up a static electric charge during transport. All these properties have the result that the round blank ring 30 made from plastic cannot easily be transported the way a comparable metallic round blank part 21 is.

Figure 2:
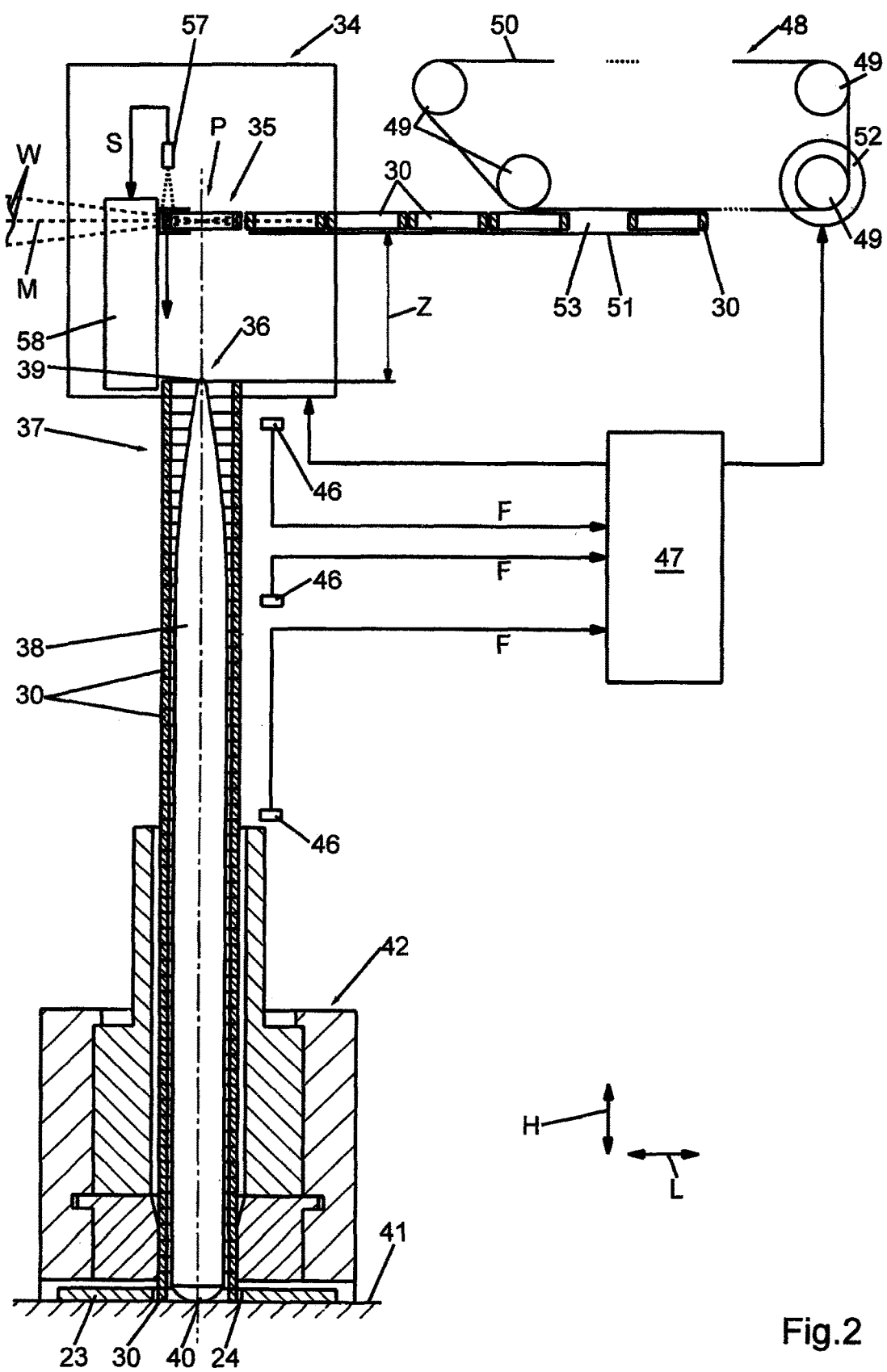
FIG. 2 is a schematic block diagram-like representation of a sample embodiment of a feed device for conveying or feeding round blank rings made from plastic from a receiving location to a delivery location.

FIG. 2 illustrates a sample embodiment of a feed device 34, that feeds the round blank ring 30 from a receiving location 35 to a delivery location 36. In a height direction H, the receiving location 35 is located above the delivery location 36. In the sample embodiment, the height direction H is oriented in the vertical direction. In departure from this, it is also possible for the height direction H to be inclined at an acute angle to the vertical direction. In the height direction H, there is a height difference z between the receiving location 35 and the delivery location 36. The height difference z can be a few centimeters, for example.

The delivery location 36 represents a place for transferring round blank rings 30 to or into a buffer storage 37. According to the example, the buffer storage 37 has a pin 38 that extends in height direction H. The pin 38 has a cylindrical, according to the example circular cylindrical cross sectional shape and tapers, for example conically, in an upper section toward delivery location 36. An upper free end 39 of the pin 38 is associated with the delivery location 36. The round blank rings 30 are threaded on over this upper end 39 of the pin 38, so that they can be stacked on top of one other along the pin 38, as is illustrated in FIG. 2.

Opposite the upper end 39 of the pin 38, there is a lower end 40 that is associated with the rotary table 23. The weight of the pin 38 causes its lower end 40 to lie either on a transport surface 41 or on the rotary table 23. Rotating the rotary table 23 about its rotary table axis moves the lowest round blank ring 30 of the buffer storage 37 along the transport surface 41 in a pocket 24. As soon as the round blank ring 30 comes in contact with the lower end 40, the pin 38 is raised in the height direction H and releases the round blank ring 30. Then, the lower end 40 slides along the rotary table 23 until the next pocket 24 arrives under the pin 38, and the pin 38 and the lowest round blank ring 30 fall into the pocket 24. This makes it possible, at the delivery location 36, to remove round blank rings 30 fed to the buffer storage 37 at the opposite end of the stack of round blank rings 30. In the process, the pin 38 executes a movement in the height direction H.

The pin 38 itself is loosely arranged in a sleeve-shaped holder 42. In the area of the sleeve-shaped holder 42, the pin 38 is braced against the inner wall of the sleeve-shaped holder 42 through the round blank rings 30 stacked on top of one another. The play between the outer periphery of the round blank rings 30 and the inner periphery of the sleeve-shaped holder 42 defines the maximum possible deviation of the longitudinal axis of the pin 38 from the height direction.

The buffer storage 37 and the pin 38 are associated with at least one filling level sensor 46, according to the example three filling level sensors 46. Every filling level sensor 46 outputs a filling level signal F to a control unit 47. The three filling level sensors 46 are arranged at different locations in the height direction H along the pin 38. Every filling level signal F indicates whether a round blank ring 30 is present at the height, in the height direction H, of the filling level sensor 46 in question. This makes it possible to detect the height of the stack of round blank rings 30. The filling level sensors 46 are placed so that a maximum filling of the buffer storage 37 and/or a minimum filling of the buffer storage 37 can be detected by the at least one filling level signal F of the at least one filling level sensor 46.

Moreover, the feeding device 34 is associated with a transport device 48. The transport device 48 transports round blank rings 30 from a container or another supply to the receiving location 35. To accomplish this, the transport device 48 has a transport belt 50 that is guided by multiple rollers 49. A section of the transport belt 50 lies opposite sliding surface 51 at a distance that essentially corresponds to the height of the round blank rings 30. The transport belt 50 presses on the round blank rings 30 and carries them along by friction in the direction of motion of the transport belt 50, the round blank rings 30 sliding along the sliding surface 51. The control unit 47 controls a drive 52 of the transport device 48 to drive at least one of the rollers 49.

Figure 4:
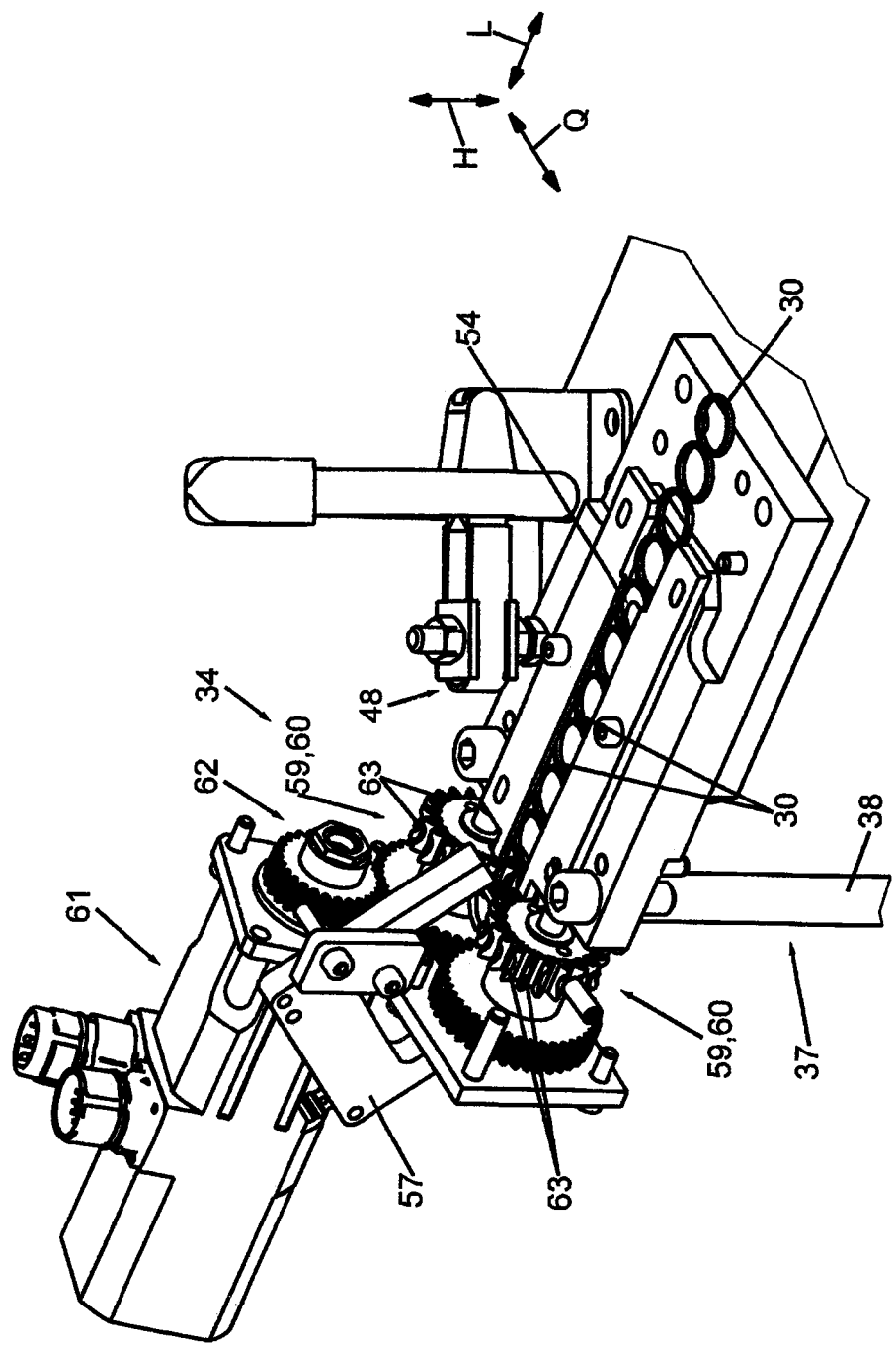
FIG. 4 is a perspective partial representation of the sample embodiment of the feed device from FIG. 3.

The transport belt 50 does not guide them all the way to the receiving location 35, but rather ends at a distance short of it. The transport device 48 transports the round blank rings 30 in a longitudinal direction L to the receiving location 35, according to the example along a transport groove 54 (FIG. 4). FIG. 4 does not show the transport belt 50 or the rollers 49. The round blank rings 30 are transported to the receiving location 35 by pushing them one after the other in a row while they are lying on the sliding surface 51. The transport groove 54 guides the round blank rings 30 on the sides. Therefore, it is sufficient for the transport belt 50 to move part of the round blank rings 30.

The force between the transport belt 50 and the round blank rings 30 is set up so that the transport belt 50 can move relative to the round blank rings 30. Therefore, there can be slippage, so to speak. Thus, the round blank rings 30 are not transported to the receiving location 35 in a fixed predefined cycle. Spaces or gaps 53 between adjacent round blank rings 30 mean that the length of time between when a round blank ring 30 is transported away from the receiving location 35 and when it reaches the delivery location 36 can be different from the length of time until the next round blank ring 30 has reached the receiving location 35 and is located there in an initial position P in which it can be received by the feeding device 34 and transported away.

At the receiving location 35, the feed device 34 has a sensor device 57 that produces a sensor signal S. The sensor signal S indicates whether a round blank ring 30 is located at the receiving location 35 in an initial position P in which it can be conveyed away from the receiving location 35 in the direction toward the delivery location 36. The sensor signal S is sent to a controller of a conveying unit 58 of the feed device 34. The conveying unit 58 is only very schematically illustrated in FIG. 2. It is provided and configured to receive, at the receiving location 35, a round blank ring 30 that is located in the initial position P, to transport it to the delivery location 36, and to deliver it there.

During the conveyance movement from the receiving location 35 to the delivery location 36, it is important that the conveying unit 58 convey the round blank rings 30 in a positively guided manner, for example by holding them in a form-fit manner. A free-fall movement or sliding motion along a sloping surface due to the weight of the round blank rings 30 is avoided. The conveying unit 58 specifies not only the position of a round blank ring 30 during the conveyance movement, but rather also its orientation relative to the height direction H and its speed of movement and, consequently, the conveyance speed. The conveyance speed is independent of the fall speed that a round blank ring 30 can achieve due to its weight; in particular it is greater. The result is that the conveying unit 58 can convey at least 250 round blank rings per minute, and up to 1,000 round blank rings per minute, from the receiving location 35 to the delivery location 36.

Every round blank ring 30 has a midplane M that is oriented at right angles to a central axis, about which the round blank ring 30 extends in its peripheral direction U. The midplane M for the round blank ring 30 located in the initial position P is shown in FIG. 2.

The conveying unit 58 is configured to specify the orientation of the midplane M with respect to the height direction H, or to limit a desired position's deviation of from this orientation to a tolerance range. For example, during the conveyance movement from the receiving location 35 to the delivery location 36, the midplane M is ideally oriented at right angles to the height direction H. The conveying unit 58 specifies the maximum angle of inclination w that defines the maximum deviation, in the height direction, of the midplane M from the desired orientation at a right angle to the height direction (FIG. 2).

Therefore, the tolerance range for the inclination of the midplane M in the height direction H is 90°−w to 90°+w.

Moreover, the conveying unit 58 is configured to move the conveyed round blank ring 30 without a retention force acting radial to its central axis. In this radial direction, the conveying unit 58 limits the movement of the round blank ring 30, without deforming it in the process. As the round blank ring 30 is being conveyed in the height direction, it is held in the conveying unit 58, according to the example parallel to its midplane M, with movement play.

Specifying the orientation of the round blank ring 30 at each point in time during the conveyance movement avoids faults due to jamming or deformed round blank rings 30 as the light plastic rings are conveyed from the receiving location 35 to the delivery location 36. Reliable conveyance from the receiving location 35 down to the delivery location 36 is ensured.

Figure 3:
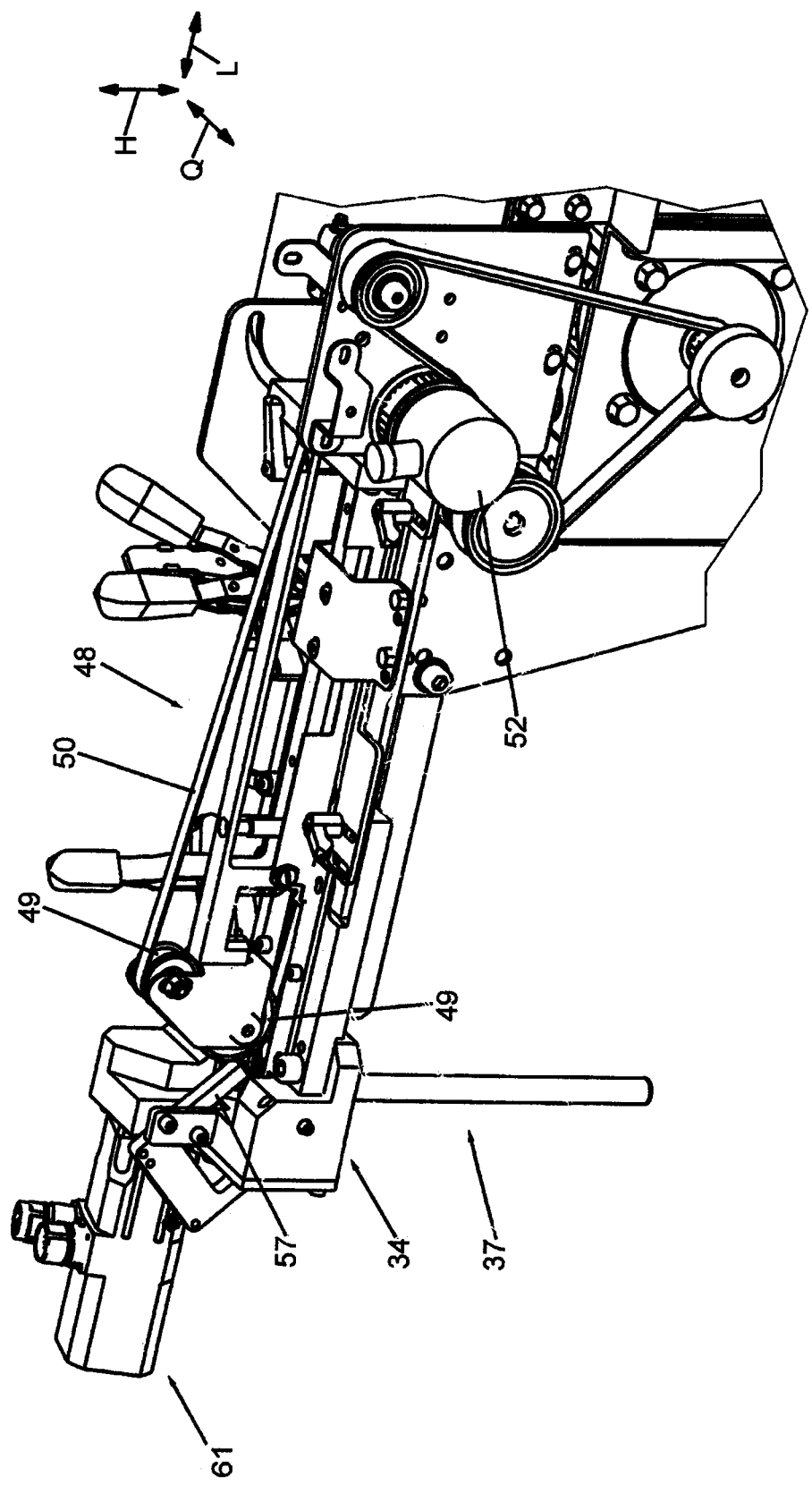
FIG. 3 is a perspective view of an embodiment of the feed device from FIG. 2.
Figure 5:
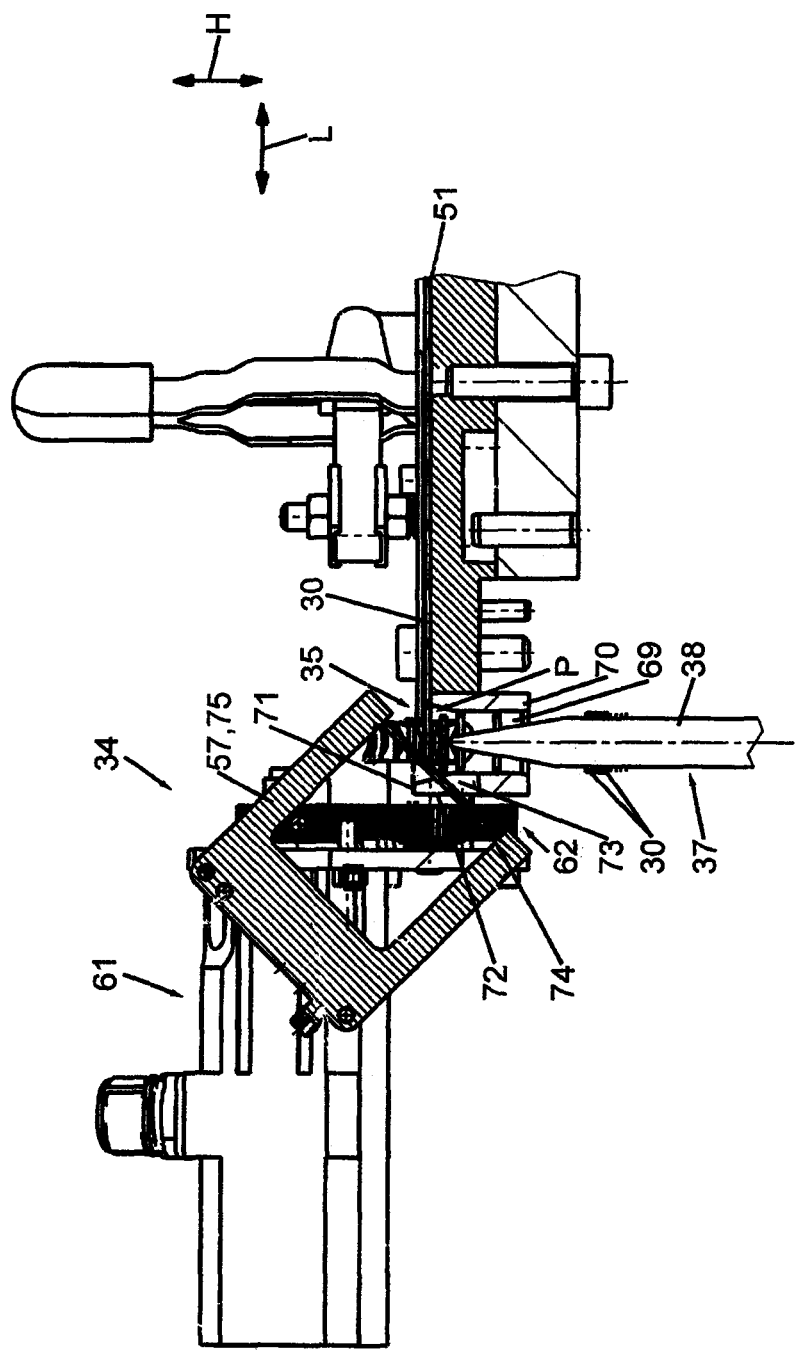
FIG. 5 is a longitudinal section through the part of the feed device from FIG. 4.

FIGS. 3 through 5 illustrate a first sample embodiment of the feed device 34 or the conveying unit 58. The conveying unit 58 has at least one, in the sample embodiment two conveying units 59 that are rotationally driven by a motor. In the sample embodiment, each conveying unit 59 is formed by a gear 60 that is in the form of a spur or cylinder gear. Each of the two gears 60 is drivable about an axis of rotation. The two axes of rotation are oriented parallel to one another and extend in a longitudinal direction L, at right angles to the height direction H and at right angles to a transverse direction Q.

The conveying unit 58 has a conveyor motor 61, which is, according to the example, in the form of an electric motor. The conveyor motor 61 has a driving connection with the two conveying units 59 or the gears 60 through a transmission 62, according to the example a spur gear transmission. Therefore, the rotation of the two gears 60 about their respective axes of rotation D is mechanically coupled in a positively guided manner through the transmission 62.

The two gears 60 are identical. They have the same diameter and the same number of teeth 63. Between two immediately adjacent teeth 63 of a gear 60 there is a tooth gap 64. Every tooth gap 64 forms a groove-like receiving recess 65 of a conveying unit 59. As can be seen especially in FIG. 4, the tips of the teeth are not rectilinear in the direction parallel to the axis of rotation D of the respective gear 60, but rather have a depression or concavity in this direction. This ensures that the movement of the pin 38 in the height direction H does not cause any collisions of the teeth 63 with the pin 38, due to the small diameter of the round blank rings 30 and the resulting small space of the axes of rotation D of the two gears 60. If the axes of rotation D are spaced in the transverse direction Q by a sufficiently large distance, the depression in the tips of the teeth can be eliminated.

When viewed in the height direction H [sic], the receiving location 35 is located in a plane in which the two axes of rotation D of the gears 60 extend. A round blank ring 30 has reached its initial position P when it is positioned between the two gears 60, so that each of two diametrically opposite places on it engages into a tooth gap 64.

Figure 6:
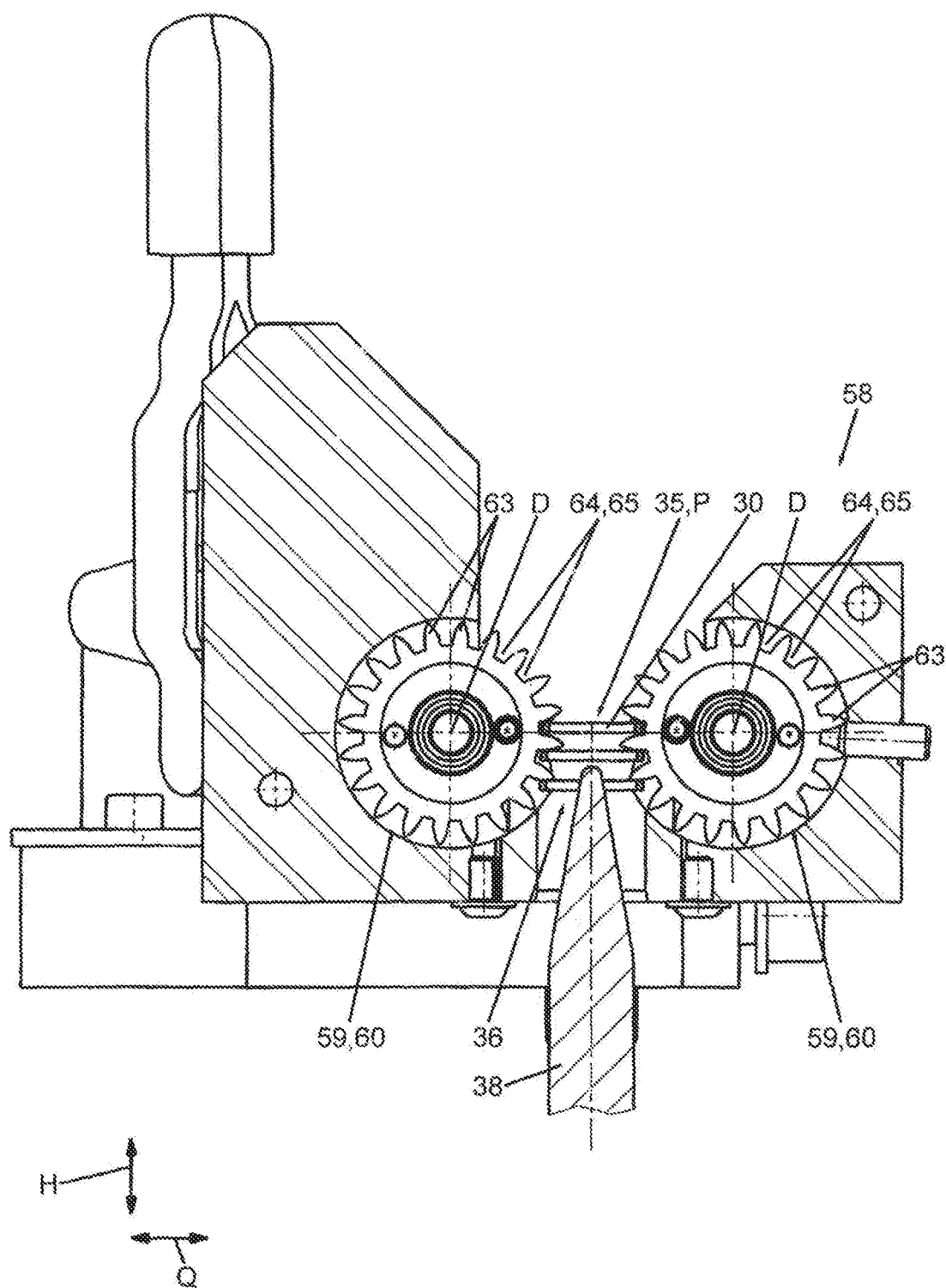
FIG. 6 is a cross section through the part of the feed device from FIG. 4.

In FIGS. 5 and 6 it can be seen that a guiding channel 69 extends coaxial to the longitudinal axis of the pin 38, between the receiving location 35 and at least as far, in the height direction H, as the delivery location 36, or beyond it. In the sample embodiment, at least sections of the guiding channel 69 are delimited in the peripheral direction by a guide sleeve 70. Starting from the receiving location 35, the guide sleeve 70 tapers in the height direction H, at least along a section of the guiding channel 69. According to the example, the guide sleeve 70 has, following the receiving location 35, a conically tapering channel section, which in turn is followed by a channel section with a constant cross section, for example a circular cross section. The delivery location 36 is located within the section of the guiding channel 69 with a constant cross section.

The conveying unit 58 is configured to transport a round blank ring 30 through the guiding channel 69. To accomplish this, the two gears 60 in the sample embodiment shown in FIGS. 3 through 6 project into the guiding channel 69 from opposite sides in transverse direction Q. The guide sleeve has corresponding cutouts. The guide sleeve can also be formed by separate sleeve parts, which are opposite one another in the longitudinal direction L and spaced from one another.

When viewed in the longitudinal direction L, the transport device 48 moves or pushes the round blank rings 30 to the receiving location 35 on one side. The back part 72 of the guide sleeve 70 that is opposite in longitudinal direction L can be in the form of a stop to limit the feed movement in the longitudinal direction L for a round blank ring 30.

In this back part 72, the guide sleeve 70 has an opening 73, which is, according to the example, in the form of a slit. This opening 73 allows a light beam 74 of a sensor device 57 in the form of a light barrier 75 to pass unhindered from a transmitter to a receiver of the light barrier 75. In so doing, the light beam 74 crosses the guiding channel 69 at the receiving location 35. As soon as a round blank ring 30 has been moved into its receiving [sic] position P, the light beam 74 is at least briefly interrupted, and the light barrier 75 recognizes that a round blank ring 30 is located in the initial position P (FIG. 5). Following that, the sensor signal S of the conveying unit 58 indicates that a round blank ring 30 is present in initial position P, triggering the conveyance movement of the conveying unit 58. In the sample embodiment according to FIGS. 3-6, the conveying unit 59 or the gears 60 are rotated by a predefined angle of rotation, so that at the receiving location 35 two tooth gaps 64 or receiving recesses 65 are once again opposite one another and can receive the next round blank ring 30. Consequently, each of the two gears 60 is intermittently rotationally driven by a predefined angle. According to the example, every rotation further rotates the gears 60 by an angle that corresponds to the distance between two immediately adjacent tooth gaps 64.

At the delivery location, when the teeth 63 limiting the tooth gaps 64 release a round blank ring 30 so that it can fall downward in the height direction H, the pin 38 is already engaging into the round blank ring 30, or the remaining distance to the upper end 39 of the pin 38 is so small that the round blank ring 30 is forced to be threaded onto the pin 38. This applies for all positions of the pin 38 as it moves in the height direction. In every position of the pin 38, its top end 39 is at a distance, in the height direction H, from the receiving location 35. Otherwise, the pin 38 could hinder the feeding of round blank rings 30 to the receiving location 35.

In the sample embodiment according to FIGS. 3 through 6, every receiving recess 65 of a conveying unit 69 has only one round blank ring 30 located in it. The at least one conveying unit 69 or the at least one gear 60 can hold multiple round blank rings 30 in adjacent receiving recesses 65 or tooth gaps 64 and move them in height direction H. The conveyed round blank rings 30 are spaced in the height direction H by a distance that is, according to the example, determined by the tooth 63 between each two adjacent tooth gaps 64.

A round blank ring 30 that is being conveyed or moved in the height direction H from the receiving location 35 to the delivery location 36 can be held, by the two gears 60, in a desired orientation and moved with the required conveyance speed. Tipping of the midplane M in the height direction H is delimited by the two teeth 63 bordering a tooth gap 64 in question. Therefore, the midplane M of a round blank ring 30 remains oriented essentially at right angles to the height direction H. A movement parallel to the midplane M is restricted by the guiding channel 69, according to the example the guide sleeve 70. Instead of a continuous guide sleeve 70, the guiding channel 69 could also be defined by guide elements limiting the guiding channel 69 that extend in the height direction H and that are spaced from one another.

Figure 7:
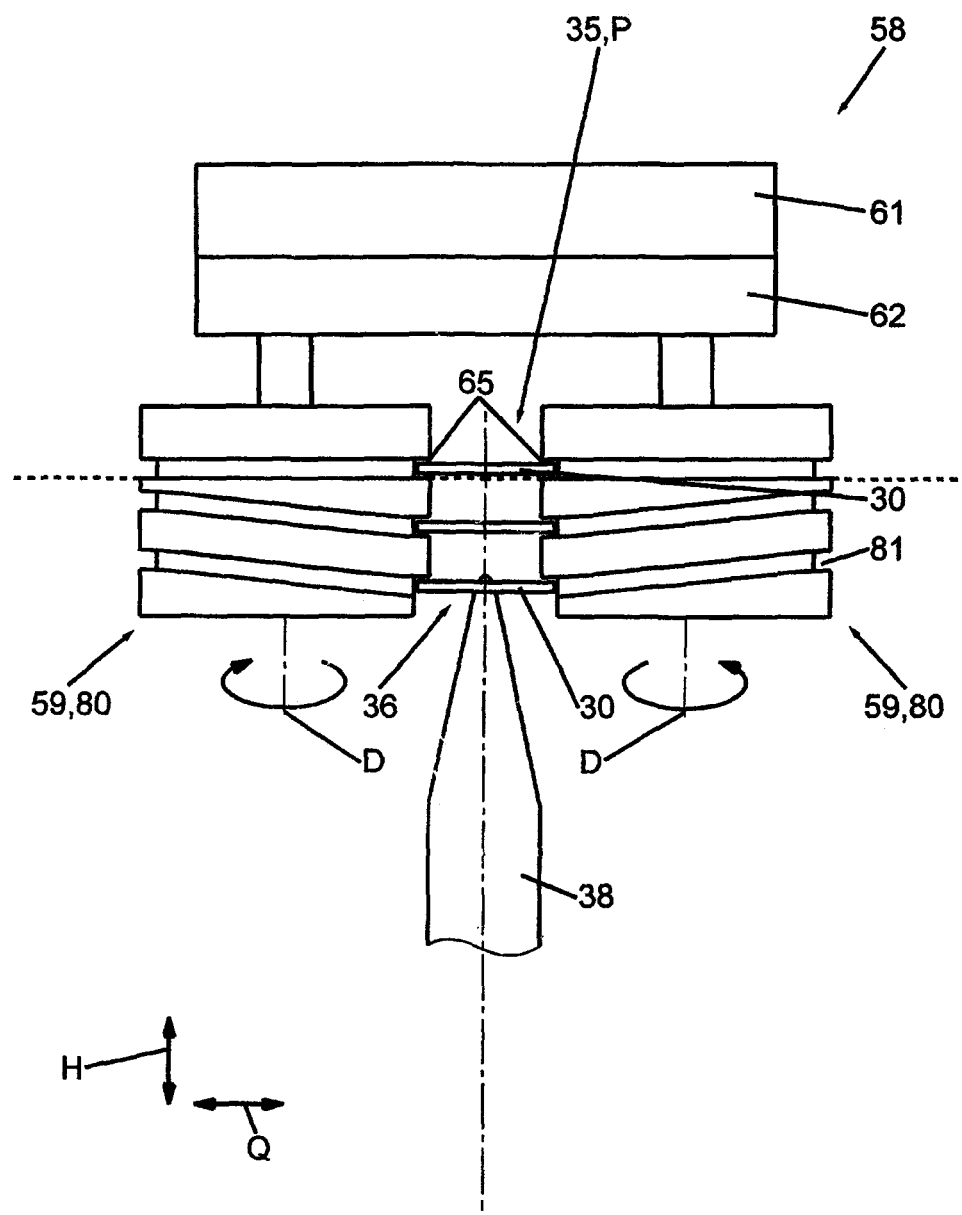
FIG. 7 is a highly schematic representation of another sample embodiment of a feed device with conveying spindles.

FIG. 7 shows another greatly simplified sample embodiment of a conveying unit 58 with two conveying elements 59 that are driven by the conveyor motor 61, it being possible for a transmission 62 to be present between the conveyor motor 61 and the conveying units 59. In contrast to the sample embodiment according to FIGS. 3 through 6, the conveying units 59 are formed by conveying spindles 80. Each of the conveying spindles 80 is cylindrical. Each conveying spindle 80 is driven about an axis of rotation D extending along the cylindrical axis of the conveying spindles 80. The axes of rotation D of the conveying spindles 80 are spaced from one another in the transverse direction Q and run parallel to one another in the height direction H. In other respects, the embodiment can correspond to the preceding sample embodiment.

Each conveying spindle 80 has a conveying groove 81, at least sections of which helically circle the respective axis of rotation D. The conveying groove 81 is open to the outside in the radial direction to the respective axis of rotation D. At the delivery location 36, the conveying groove 81 is open downward at least in the height direction H, so that a round blank ring 30 can fall out of the conveying groove 81 and can, in the process, be threaded onto the pin 38.

While the gears 60 in the preceding sample embodiment are always driven in opposite directions about their axes of rotation D, the two conveying spindles 80 can be driven either in the same direction or—as illustrated in FIG. 7—in the opposite direction, depending on the selected course of the conveying grooves 81.

The conveying spindles 80 can be driven intermittently, analogously to the gears 60. It is also possible to drive the conveying spindles 80 so that they rotate continuously. This can be achieved by the conveying grooves 81 having, in the area of the receiving location 35, a section in which they have no pitch and run in a plane at right angles to the height direction H. If a round blank ring 30 is moved into the initial position P while this pitchless section of the conveying groove 81 is adjacent to the receiving location 35 and the round blank ring 30 can be introduced into this section, its conveyance movement in the height direction H is triggered only once this pitchless section changes into the helical section of the conveying groove 81. Such a pitchless section of the conveying groove 81 can compensate for time differences that can occur as the round blank rings 30 are fed to the receiving location 35.

Both in the sample embodiment according to FIGS. 3 through 6, and also in the sample embodiment from FIG. 7, as the conveying unit 58 or the two conveying elements 59 convey the round blank rings 30, the round blank rings 30 are held in a receiving recess 65 at each of two places that are spaced from one another in the peripheral direction U, according to the example diametrically opposite places, this receiving recess 65 being formed by either a tooth gap 64 or a section of the conveying groove 81. At the places where the round blank ring 30 projects into the receiving recess 64, in both sample embodiments the round blank ring 30 is surrounded by two delimiting surfaces that are opposite in the height direction H. In the sample embodiment according to FIGS. 3 through 6, the delimiting surfaces are formed by two tooth flanks delimiting a tooth gap 64, and in the sample embodiment according to FIG. 7 they are formed by the two opposite groove sides of the conveying groove 81. In both sample embodiments, the orientation of the midplane M of the round blank ring 30 is predefined relative to the height direction H or is restricted by the play that is present between the round blank ring and the receiving recess 65.

Figure 8:
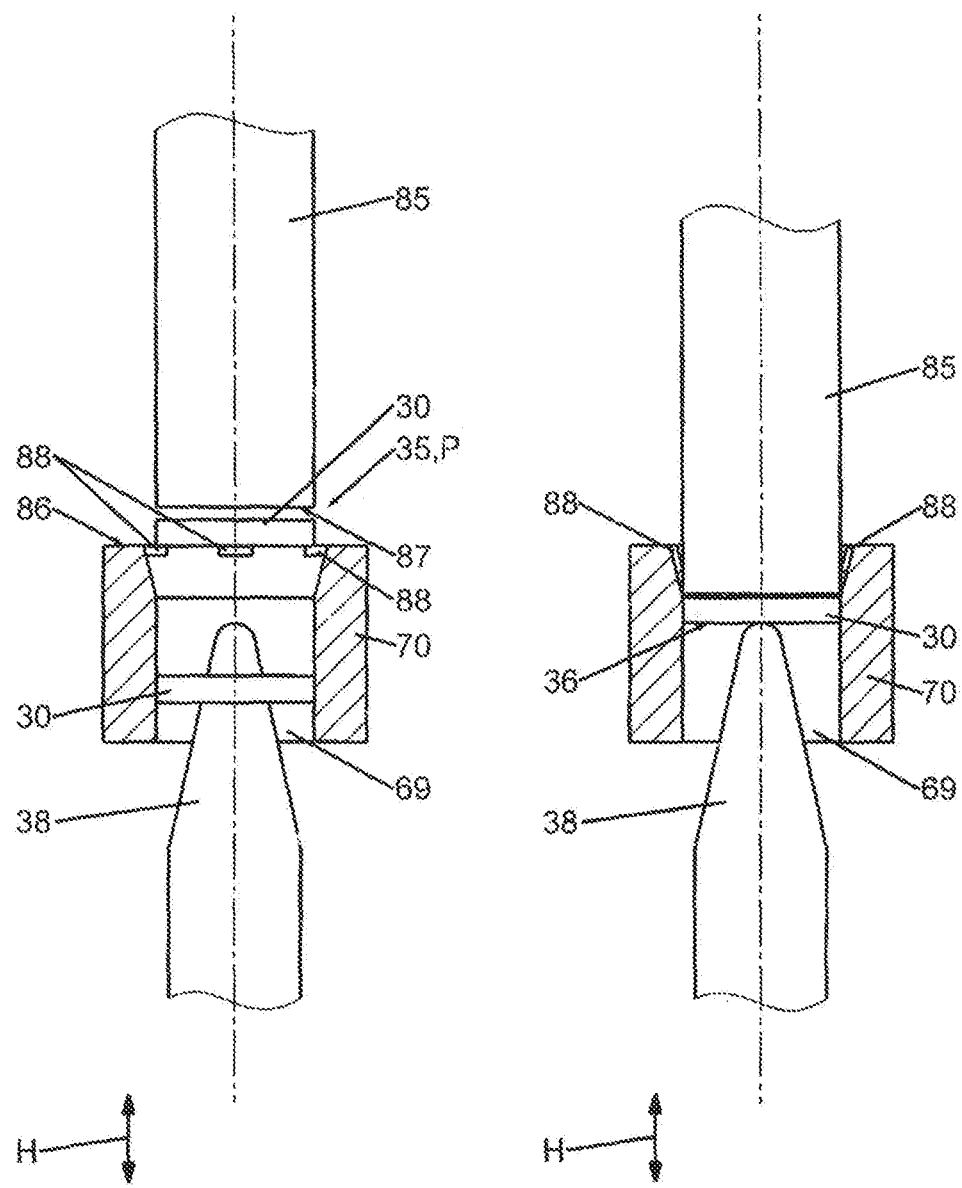
FIG. 8 is a highly schematic representation of another sample embodiment of a feed device with a ramming tool that can be moved in the height direction.
Figure 9:
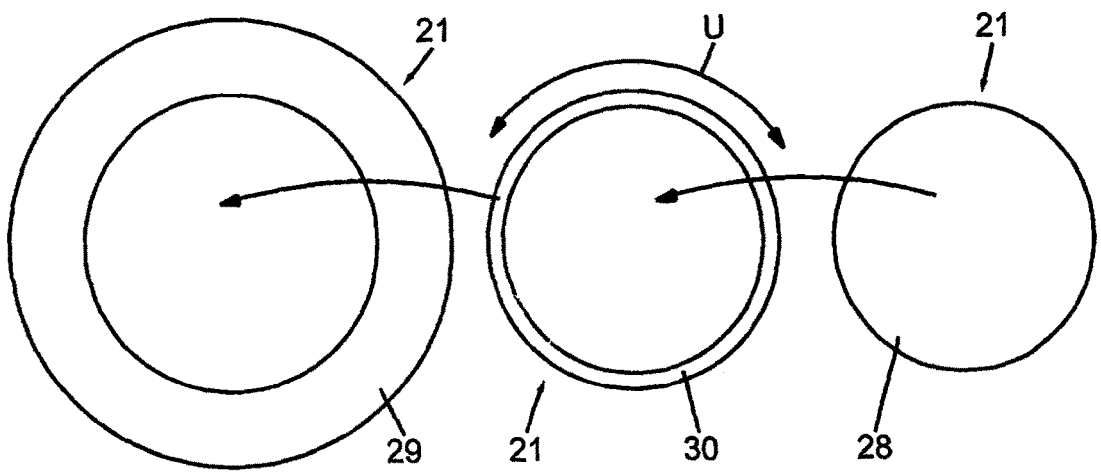
FIG. 9 is a schematic representation of the structure of a coin or round blank with an outer ring, a round blank ring, and a round blank core in unassembled state.

FIG. 8 illustrates another sample embodiment of a conveying unit 58. The guide sleeve 70 with the guiding channel 69 extends from the receiving location 35 to the delivery location 36 or beyond it, analogously to the sample embodiment according to FIGS. 3 through 6, it being possible here for the guide sleeve 70 to be completely closed in the peripheral direction. Coaxial to the guiding channel 69 there is a ramming tool 85 that can be moved back and forth in the height direction H. A round blank ring 30 arranged in its initial position P is protected from falling in the height direction H by holding means 86 in its initial position P.

A downward movement of the ramming tool 85 moves a round blank ring 30 located in the initial position P downward in the height direction H in and through the guiding channel 69 to the delivery location 36. The fact that the downward movement of the ramming tool 85 is sufficiently fast means that a contact surface 87 of the ramming tool, this contact surface 87 lying against the round blank ring 30, determines the orientation of the round blank ring 30 during the conveyance movement. The contact surface 87 is arranged against the face of the ramming tool 85, according to the example in the form of a planar surface that extends at right angles to the height direction H. As soon as the contact surface 87 comes in contact with the round blank ring 30 located in the initial position P at the receiving location 35, the midplane M of the round blank ring 30 is oriented parallel to this contact surface 87, and consequently also at right angles to the height direction H. In this orientation and under continuous contact between the round blank ring 30 and the ramming tool 85, the round blank ring 30 is moved in the guiding channel 69 from the receiving location 35 to the delivery location 36. The right picture in FIG. 8 shows it reaching the delivery location 36.

The holding means 86 must release the downward movement of the round blank ring 30. In the sample embodiment described here, the holding means 86 are formed by multiple elastic tongues 88 arranged around the guiding channel 69 in the peripheral direction. The elastic tongues 88 are sufficiently resistant to bending to hold a round blank ring 30 lying on these tongues 88 in its initial position P. They give way when the ramming tool 85 reaches the round blank ring 30 located in the initial position P and moves in the height direction H into the guiding channel 69 (FIG. 8). After the ramming tool 85 is withdrawn from the guiding channel 69, the elastic tongues 88 elastically spring back into their rest position, which is illustrated in the left picture in FIG. 8. Then the next round blank ring 30 can be moved into the initial position, for example by the transport device 48.

Instead of the individual tongues 88, the holding means 86 could also be formed by an elastic ring that continuously extends in the peripheral direction. Instead of elastically pliable holding means 86, it is also possible to provide holding means that can be actively moved between a holding position and a release position.

As is schematically illustrated in FIG. 1, the round blank ring 30 is moved by arrangement 20, according to the example also using the feed device 34, from the receiving location 35 to the delivery location 36, and then along the pin 38 all the way to a pocket 24 of the rotary table 23. In the pocket 24, the round blank ring 30 is then further transported to an assembly station 90, in which it is assembled with the outer ring 29 or inserted into the outer ring 29. Alternatively to this, the round blank ring 30 could also first be connected with the round blank core 28 in a corresponding assembly station. As soon as the round blank ring 30 has been connected with one of the other two round blank parts 21, the subassembly made from the round blank ring 30 and the at least one other round blank part 21 has a sufficient mass and sufficiently large spring stiffness that it can be further transported the way previously known multiple-part coins are. An important aspect of this invention is that the round blank ring 30 made from plastic is always conveyed in a positively guided manner from the receiving location 35 until it is assembled, in the assembly station 90, with the at least one other round blank part 21, to ensure reliable transport. Free, undefined movements relating to the position and/or the orientation of the midplane with respect to the height direction H are avoided.

The invention relates to an arrangement 20 to transport a round blank ring 30 made from plastic from a receiving location 35 to an assembly station 90. At every point in time, the orientation and the position of the round blank ring 30 are predefined, at least within a tolerance range. To execute a movement from top to bottom in a height direction H, it is possible to use a feed device 34 with a motor-driven conveying unit 58. This conveying unit 58 moves one or more round blank rings 30 in a positively guided manner downward in the height direction H to a delivery location 36. At every point in time as this is done, the orientation of the round blank ring relative to the height direction H is defined, at least within a predefined tolerance range.

LIST OF REFERENCE NUMBERS

20 Arrangement
21 Round blank part
22 Minting station
23 Rotary table
24 Pocket
27 Coin
28 Round blank core
29 Outer ring
30 Round blank ring
34 Feed device
35 Receiving location
36 Delivery location
37 Buffer storage
38 Pin
39 Upper end of pin
40 Lower end of pin
41 Transport surface
42 Holder
46 Filling level sensor
47 Control unit
48 Transport device
49 Roller
50 Transport belt
51 Sliding surface
52 Drive
53 Gap
54 Transport groove
57 Sensor device
58 Conveying unit
59 Conveying Unit
60 Gear
61 Conveyor motor
62 Transmission
63 Tooth
64 Tooth gap
65 Receiving recess
69 Guiding channel
70 Guide sleeve
71 Upper edge of guide sleeve
72 Back part of guide sleeve
73 Opening
74 Light beam
75 Light barrier
80 Conveying spindle
81 Conveying groove
85 Ramming tool
86 Holding means
87 Contact surface of ramming tool
88 Tongue
89
90 Assembly station
D Axis of rotation
F Filling level signal
H Height direction
L Longitudinal direction
M Midplane
P Initial position
Q Transverse direction
S Sensor Signal
U Peripheral Direction
w Amount of angle of inclination
z Difference in height

What is claimed is:

1. A feed device (34) for feeding round blank rings (30) made from plastic from a receiving location (35) to a delivery location (36) arranged below the receiving location (35) in a height direction (H), having a motor-driven conveying unit (58) which is configured to convey a round blank ring (30) with a conveyance speed from the receiving location (35) to the delivery location (36) downwards in the height direction (H) independent from the weight of the round blank ring (30) in a positively guided manner such that the orientation of the round blank ring (30) with respect to the height direction (H) is predefined at every moment and/or is restricted to a predefined tolerance range.

2. A feed device according to claim 1, characterized in that the delivery location (36) is arranged at an upper end (39) of a pin (38) moving in the height direction (H).

3. A feed device according to claim 1, characterized in that the conveyance movement in the height direction (H) is carried out with a conveyance speed that is independent of a fall speed resulting from the weight of the round blank ring (30).

4. A feed device according to claim 1, characterized in that the conveying unit (58) is configured to convey, in the height direction (H), a single round blank ring (30) and/or multiple round blank rings (30) simultaneously that are spaced from one another in the height direction (H).

5. A feed device according to claim 1, characterized in that the conveying unit (58) engage upon the round blank ring (30) at least in two locations that are distant from one another in the peripheral direction (U).

6. A feed device according to claim 1, characterized in that the conveying unit (58) overlaps the round blank ring (30) at least at one location on the top and bottom.

7. A feed device according to claim 1, characterized in that the conveying unit (58) has at least one rotationally driven conveying element (59).

8. A feed device according to claim 7, characterized in that the at least one conveying element (59) is driven without reversing the direction of rotation.

9. A feed device according to claim 7, characterized in that the at least one conveying element (59) is drivable about an axis of rotation (D) that is oriented in the height direction (H) or in a transverse direction (Q) at a right angle to the height direction (H).

10. A feed device according to claim 7, characterized in that the at least one conveying element (59) has a receiving recess (65) that is delimited by a delimiting surface in each of the upward and downward directions.

11. A feed device according to claim 7, characterized in that the at least one conveying element (59) is formed by a gear (60).

12. A feed device according to claim 11, characterized in that a tooth gap (64) between two teeth (63) of the gear (60) forms the receiving recess (65).

13. A feed device according to claim 7, characterized in that the at least one conveying element (59) is formed by a conveying spindle (80).

14. A feed device according to claim 13, characterized in that a conveying groove (81), helically extending around the axis of rotation of the conveying spindle (80) at least in a section, forms a receiving recess (65).

15. A feed device according to claim 7, characterized in that there are two conveying elements (59) spaced from one another in a transverse direction (Q) at a right angle to the height direction (H).

16. A feed device according to claim 1, characterized in that there is, at the receiving location (35), a sensor device (57) that is configured to detect whether there is a round blank ring (30) in an initial position (P) at the receiving location (35).

17. A feed device according to claim 16, characterized in that the sensor device (57) transmits a sensor signal (S) to the conveying unit (58) that indicates whether there is a round blank ring (30) in an initial position (P) at the receiving location (35), and in that the conveying unit (58) starts the conveyance movement when the sensor signal (S) indicates that a round blank ring (30) has reached the initial position (P).

18. A feed device according to claim 1, characterized in that the conveying speed of the round blank ring (30) downward in height direction (H) provided by the conveying unit (58) is greater than a fall speed that could be achieved due to the weight of the round blank ring (30).

19. A feed device according to claim 1, characterized in that the conveying unit (58) is configured to convey the round blank rings (30) with a higher speed downward in the height direction (H) than the round blank rings (30) are moved to the receiving location (35).

20. An arrangement for transporting round blank rings (30) made from plastic from a receiving location (35) to an assembly station (90), at which the round blank ring (30) is assembled with another round blank part (21), a feed device (34) for feeding the round blank rings (30) from the receiving location (35) to a delivery location (36) arranged below the receiving location (35) in a height direction (H), with at least one motor-driven conveying unit (58) which is configured to convey the round blank ring (30) with a conveyance speed from the receiving location (35) to the delivery location (36) downward in the height direction (H) independent from the weight of the round blank ring (30) in a positively guided manner such that the orientation of the round blank ring (30) with respect to the vertical or horizontal direction is predefined at every moment and/or is restricted to a predefined tolerance range.

21. The arrangement according to claim 20, characterized in that the conveying speed of the round blank ring (30) downward in height direction (H) provided by the conveying unit (58) is greater than a fall speed that could be achieved due to the weight of the round blank ring (30).

22. The arrangement according to claim 20, characterized in that the conveying unit (58) is configured to convey the round blank rings (30) with a higher speed downward in the height direction (H) than the round blank rings (30) are moved to the receiving location (35).

* * * * *